(12) United States Patent
Fukui

(10) Patent No.: US 8,330,875 B2
(45) Date of Patent: Dec. 11, 2012

(54) TELEVISION RECEIVER

(75) Inventor: Masanao Fukui, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1176 days.

(21) Appl. No.: 11/975,999

(22) Filed: Oct. 23, 2007

(65) Prior Publication Data

US 2008/0094522 A1   Apr. 24, 2008

(30) Foreign Application Priority Data

Oct. 23, 2006  (JP) .................................... 2006-8611

(51) Int. Cl.
*H04N 5/50* (2006.01)
(52) U.S. Cl. ........ 348/733; 348/731; 348/732; 455/337; 455/338; 455/339
(58) Field of Classification Search .......... 348/731–733; 455/337–339
See application file for complete search history.

(56) References Cited

U.S. PATENT DOCUMENTS

| | | | | |
|---|---|---|---|---|
| 6,137,546 | A * | 10/2000 | Shintani et al. | 348/731 |
| 6,643,502 | B1 * | 11/2003 | Van De Plassche et al. | 455/339 |
| 6,731,349 | B1 * | 5/2004 | Van Der Wijst | 348/732 |
| 6,975,844 | B2 * | 12/2005 | Obitsu | 455/193.1 |
| 2006/0222115 | A1 * | 10/2006 | Dornbusch et al. | 375/345 |
| 2007/0229716 | A1 * | 10/2007 | Utsunomiya et al. | 348/731 |

FOREIGN PATENT DOCUMENTS

| | | |
|---|---|---|
| JP | 11-126178 | 5/1999 |
| JP | 2001-309261 | 11/2001 |
| JP | 2004-23451 | 1/2004 |
| JP | 2004-507911 | 3/2004 |
| WO | WO-01/97512 A2 | 12/2001 |

OTHER PUBLICATIONS

Utility Model Technical Opinion in Accordance with Utility Model Law Article 12 for Japanese Utility Model Application No. 2006-008611, dated Dec. 21, 2006 (9 pages).
Patent Abstracts of Japan for Japanese Publication No. 2004-023451, Publication date Jan. 22, 2004 (2 pages).
Patent Abstracts of Japan for Japanese Publication No. 11-126178, Publication date May 11, 1999 (2 pages).
Patent Abstracts of Japan for Japanese Publication No. 2001-309261, Publication date Nov. 2, 2001 (2 pages).

* cited by examiner

*Primary Examiner* — Pankaj Kumar
*Assistant Examiner* — Charles N Hicks
(74) *Attorney, Agent, or Firm* — Osha Liang LLP

(57) ABSTRACT

The present invention provides a television receiver capable of automatically identifying the kind of a tuner and controlling the tuner in accordance with the kind. In a television receiver having a tuner for receiving a television broadcast signal and a module for detecting an intermediate frequency signal output from the tuner while controlling the tuner and outputting a video signal and an audio signal, the tuner is provided with a circuit for changing predetermined output information which is output from the tuner in accordance with the kind of the tuner, and information indicative of correspondence relation between the predetermined output information and the kind of the tuner is stored in a memory. By collating the predetermined output information output from the tuner with the information stored in the memory at the power on, the kind of the tuner is identified and, according to the kind, the module is allowed to control the tuner.

2 Claims, 7 Drawing Sheets

FIG. 4

ADDRESS DATA 51

| 1 | 1 | 0 | 0 | 0 | X1 | X0 | R/W | A |

ADDRESS SET BITS

FIG. 5

ADDRESS-TUNER TABLE 61

| ADDRESS SET BITS | | ADDRESS SET VOLTAGE LEVEL | TUNER KIND |
|---|---|---|---|
| X1 | X0 | | |
| 0 | 0 | (0~0.1) × Vcc | a |
| 0 | 1 | OPEN or (0.2~0.3) × Vcc | b |
| 1 | 0 | (0.4~0.6) × Vcc | c |
| 1 | 1 | (0.9~1.0) × Vcc | d |

FIG. 7

STATUS BYTE DATA 52

| POR | FL | 1 | 1 | 1 | Y2 | Y1 | Y0 | A |

ADC SET BITS

FIG. 8

ADC-TUNER TABLE 62

| ADC SET BITS | | | ADC SET VOLTAGE LEVEL | TUNER KIND |
|---|---|---|---|---|
| Y2 | Y1 | Y0 | | |
| 0 | 0 | 0 | (0~0.15) × Vcc | a |
| 0 | 0 | 1 | (0.15~0.3) × Vcc | b |
| 0 | 1 | 0 | (0.3~0.45) × Vcc | c |
| 0 | 1 | 1 | (0.45~0.6) × Vcc | d |
| 1 | 0 | 0 | (0.45~0.6) × Vcc | |

AFT-TUNER TABLE 63

| AFT VOLTAGE LEVEL AT THE NO-SIGNAL TIME | TUNER KIND |
|---|---|
| $(0 \sim 0.1) \times Vcc$ | a |
| $(0.2 \sim 0.3) \times Vcc$ | b |
| $(0.4 \sim 0.6) \times Vcc$ | c |
| $(0.9 \sim 1.0) \times Vcc$ | d |

TELEVISION RECEIVER

BACKGROUND OF THE INVENTION

1. Field of the Invention

The present invention relates to a television receiver including a tuner and a module for controlling the tuner.

2. Background Art

Examples of a television receiver having a tuner for receiving a television broadcast signal include a television set, a VCR (Video Cassette Recorder), a DVD (Digital Versatile Disk) recorder, an HDD (Hard Disk Drive) recorder, a composite device obtained by integrating at least two of the devices, and a simple receiver having no function of recording/reproducing a video image and sound. Tuners include a digital tuner for receiving a digital television broadcast signal, an analog tuner for receiving an analog television broadcast signal, and a digital/analog tuner for receiving both digital and analog television broadcast signals. There is a television receiver having a module for processing an IF (Intermediate Frequency) signal output from a tuner while controlling the tuner, and outputting a video signal and an audio signal.

A manufacturer of such a television receiver usually purchases a tuner from a tuner manufacturer, develops a module by the television receiver manufacturer itself, connects the tuner and the module to each other, and assembles the connected tuner and module into a receiver body. Since the specifications of tuners vary among manufactures, models, and the like, if the module cannot perform control according to the kind of a tuner, it is impossible to receive the television broadcast signal with high precision and output a video signal and an audio signal. Therefore, the television receiver manufacturer usually develops modules in accordance with the kinds of tuners used. To suppress the cost of development and manufacture of modules, a tuner used is limited to one model of one manufacturer.

However, due to lack of the number of tuners supplied or the like, there is a case that a plurality of kinds of tuners have to be alternatively used. In this case, conventionally, the circuit of a module is changed according to the kind of a tuner assembled. Japanese Unexamined Patent Application Publication (Translation of PCT Application) No. 2004-507911 discloses a technique of replaceably assembling one tuner and a nonvolatile memory that stores control information adapted to the tuner into a chassis of a television receiver. However, in such method, due to a human error, there is a case that the tuner and the module or the nonvolatile memory are not matched correctly.

On the other hand, Japanese Unexamined Patent Application Publication No. 2001-309261 discloses a technique in which a personal computer performs data communication with a tuner via a capture card, makes the tuner receive a television broadcast signal of a frequency corresponding to a channel in any of countries, determines whether the level of an AFT (Auto Frequency Tuning) signal returned from the tuner is normal or not and, on the basis of the result, automatically determines a channel station which can be tuned, and the kind of the tuner corresponding to the country with which the tuner tunes. According to such method, however, the kind of the tuner being further detailed than the country, in which the manufacturer, model, and the like are different each other, cannot be automatically determined.

SUMMARY OF THE INVENTION

The present invention has been achieved to solve such problems and an object of the invention is to provide a television receiver capable of automatically identifying the kind of a tuner and controlling the tuner in accordance with the kind.

The present invention provides a television receiver having a tuner for receiving a television broadcast signal and a module for processing an intermediate frequency signal output from the tuner while controlling the tuner, and outputting a video signal and an audio signal. The television receiver includes: a circuit provided for the tuner, for changing predetermined output information output from the tuner in accordance with the kind of the tuner; a storing unit for storing information indicative of the correspondence relation between the predetermined output information and the kind of the tuner; and an identifying unit for identifying the kind of the tuner by collating the predetermined output information output from the tuner with the information stored in the storing unit. The module controls the tuner in accordance with the kind of the tuner identified by the identifying unit.

With such a configuration, on the basis of the predetermined output information output from the tuner, which is changed according to the kind of the tuner of a different manufacturer, model, or the like, the kind of the tuner can be identified automatically and reliably, and the tuner can be controlled by the module in accordance with the kind of the tuner. As a result, even when any of a plurality of kinds of tuners is replaced, a television broadcast signal can be always received with high precision and a video signal and an audio signal can be output. Since the circuit for changing the predetermined output information output from the tuner in accordance with the kind of the tuner is provided for the tuner, it is unnecessary to replace the module or change the circuit or the like of the module, and thus the module can be commonly used, so that the cost can be reduced.

In an embodiment of the present invention, in the television receiver, the tuner receives a digital television broadcast signal, the module detects an intermediate frequency signal output from the tuner and outputs a digital video signal and a digital audio signal, the predetermined output information which is output from the tuner is data indicative of address of the tuner, transmitted from an IC provided for the tuner, the circuit provided for the tuner is a circuit for changing level of an input voltage to a predetermined port of the IC in accordance with the kind of the tuner, the IC changes a bit of a predetermined digit in the data in accordance with the level of the input voltage to the predetermined port, and transmits the data, the information stored in the storing unit is information indicative of correspondence relation between the bit of the data and the kind of the tuner, and the identifying unit identifies the kind of the tuner by receiving the data from the tuner and collating the bit of the data with the information stored in the storing unit.

With such a configuration, even when the electronic parts such as an IC used by tuners are the same, the kind of a tuner can be automatically and reliably identified, and the tuner can be controlled in accordance with the kind by the module. Since the information for identifying the kind of a tuner is included in the data indicative of the address of the tuner, without performing data communication only for identifying the kind of a tuner with the tuner, the kind of the tuner can be identified, and the process load on the data communication can be lessened.

In an embodiment of the present invention, in the television receiver, the tuner receives a digital television broadcast signal, the module detects an intermediate frequency signal which is output from the tuner and outputs a digital video signal and a digital audio signal, the predetermined output information output from the tuner is data indicative of information on control of the tuner by the module, transmitted from an IC provided for the tuner, the circuit provided for the tuner is a circuit for changing level of an input voltage to a predetermined port of the IC in accordance with the kind of the tuner, the IC changes a bit of a predetermined digit in the data in accordance with the level of the input voltage to the predetermined port, and transmits the data, the information stored in the storing unit is information indicative of correspondence relation between the bit of the data and the kind of the tuner, and the identifying unit identifies the kind of the tuner by receiving the data from the tuner and collating the bit of the data with the information stored in the storing unit.

With such a configuration, even when the electronic parts such as an IC used by tuners are the same, the kind of a tuner can be automatically and reliably identified, and the tuner can be controlled in accordance with the kind by the module. Since the information for identifying the kind of a tuner is included in the data indicative of the address of the tuner, without performing data communication only for identifying the kind of a tuner with the tuner, the kind of the tuner can be identified, and the process load on the data communication can be lessened.

In an embodiment of the present invention, in the television receiver, the tuner receives a digital television broadcast signal and an analog television broadcast signal, processes the analog television broadcast signal, and outputs an analog video signal and an analog audio signal, the module detects an intermediate frequency signal output from the tuner and outputs a digital video signal and a digital audio signal, the predetermined output information output from the tuner is an AFT (Auto Frequency Tuning) voltage which is output at the no-signal time when the tuner does not receive the television broadcast signal, the circuit provided for the tuner is a circuit for changing level of an AFT voltage at the no-signal time in accordance with the kind of the tuner, the information stored in the storing unit is information indicative of correspondence relation between the AFT voltage level at the no-signal time and the kind of the tuner, and the identifying unit identifies the kind of the tuner by collating the AFT voltage level at the no-signal time output from the tuner with the information stored in the storing unit.

With such a configuration, even when the electronic parts such as an IC used by tuners are the same, without performing data communication with the tuner, the kind of a tuner can be automatically and reliably identified, and the tuner can be controlled in accordance with the kind by the module.

In an embodiment of the present invention, in the television receiver, when a power supply is turned on for the first time or each time the power supply is turned on, the tuner transmits the predetermined transmission information, and the identifying unit identifies the kind of the tuner.

Once a control not adapted to the kind of the tuner is performed by the module, the tuner may not accept any control of the module after that in some cases. But with the configuration described above, the kind of a tuner is identified before start of control of the tuner by the module, so that the kind of the tuner can be identified more reliably, and the tuner can be controlled in accordance with the kind by the module. By identifying the kind of the tuner only at the first power-on, the process load at the following power-on can be lessened. Further, by identifying the kind of a tuner each time the power is turned on, even when a tuner is replaced due to a failure or the like, a tuner can be reliably controlled in accordance with the kind by the module. As a result, the television broadcast signal is received with high precision and the video signal and the audio signal can be output.

Further, in an embodiment of the present invention, there is provided a television receiver having a tuner for receiving a digital television broadcast signal and an analog television broadcast signal, processing the analog television broadcast signal, and outputting an analog video signal and an analog audio signal, and a module for detecting an intermediate frequency signal output from the tuner while controlling the tuner and outputting a digital video signal and a digital audio signal. The tuner is provided with at least one of a first circuit for changing level of an input voltage to a first port of an IC provided for the tuner in accordance with the kind of the tuner, a second circuit for changing level of an input voltage to a second port of the IC in accordance with the kind of the tuner, and a third circuit for changing level of an AFT voltage which is output at the no-signal time from the tuner in accordance with the kind of the tuner. The IC changes a bit of a predetermined digit in address data indicative of address of the tuner or status byte data indicative of information on control of the tuner by the module in accordance with the level of the input voltage to the first port or the second port, and transmits the resultant data. The television receiver includes: a storing unit for storing at least one of first information indicative of the correspondence relation between the bit in the address data and the kind of the tuner, second information indicative of the correspondence relation between the bit in the status byte data and the kind of the tuner, and third information indicative of the correspondence relation between the AFT voltage level at the no-signal time and the kind of the tuner; an identifying unit, when a power supply is turned on for the first time or each time the power supply is turned on, for identifying the kind of the tuner by performing at least one of collation of the bit in the address data received from the tuner with the first information, collation of the bit in the status byte data received from the tuner with the second information, and collation of the AFT voltage level at the no-signal time output from the tuner with the third information; and an upper control unit for making the module control the tuner in accordance with the kind of the tuner identified by the identifying unit.

With such a configuration, even when the electronic parts such as an IC used by tuners are the same, the kind of a tuner can be automatically and reliably identified, and the tuner can be controlled in accordance with the kind by the module. Since the tuner is provided with the first to third circuits, the module can be commonly used, and the cost can be reduced. By including the information for identifying the tuner in the address data or status byte data, without performing data communication only for identifying the kind of the tuner with the tuner, the kind of the tuner can be identified, and the process load on the data communication can be lessened. By changing the level of the AFT voltage at the no-signal time in accordance with the kind of the tuner, without performing data communication with the tuner, the kind of the tuner can be identified. Since the kind of the tuner is identified before start of control of the tuner by the module, the kind of the tuner can be identified more reliably, and the tuner can be controlled by the module in accordance with the kind. By identifying the kind of the tuner only at the first power-on, the process load at the time of the subsequent power-on operations can be lessened. By identifying the kind of a tuner at each power-on, even when the tuner is replaced, the tuner can be reliably controlled by the module in accordance with the kind. Further, by executing a combination of a plurality of identifying methods, even when identification of the kind of a tuner fails in one identifying method, the kind of the tuner can be identified by another identifying method. Thus, identification of the kind of a tuner and control according to the kind of the tuner by the module can be performed reliably and accurately.

According to the present invention, the kind of a tuner can be identified automatically and reliably, and the tuner can be controlled according to the kind by the module.

BRIEF DESCRIPTION OF THE DRAWINGS

FIG. 4 is a diagram showing address data;

FIG. 5 is a diagram showing an address-tuner table;

FIG. 7 is a diagram showing status byte data;

FIG. 8 is a diagram showing an ADC-tuner table;

DETAILED DESCRIPTION OF PREFERRED EMBODIMENTS OF THE INVENTION

Figure 1:
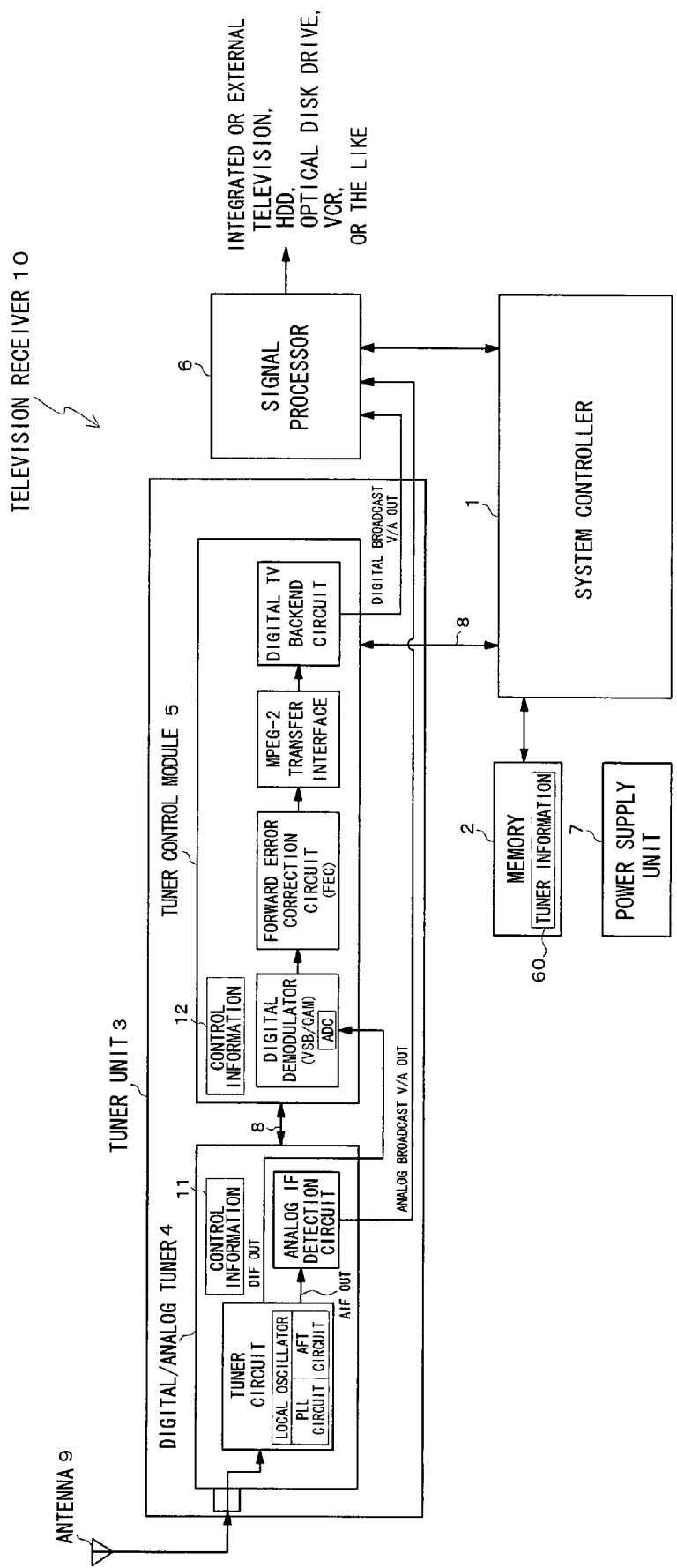
FIG. 1 is a block diagram of a television receiver.

FIG. 1 is a block diagram of a television receiver 10 as an embodiment of the present invention. A system controller 1 of the television receiver 10 includes a CPU, a ROM, a RAM, a nonvolatile memory, and the like. The system controller 1 controls the components of the television receiver 10 on the basis of programs and data stored in the ROM, RAM, and nonvolatile memory. A memory 2 is a ROM, a RAM, a nonvolatile memory, or the like. In the memory 2, tuner information 60 for identifying the kind of a digital/analog tuner (hereinafter, referred to as "tuner") 4 provided in a tuner unit 3 is stored. On the basis of predetermined output information which is output from the tuner 4 and the tuner information 60 in the memory 2, the system controller 1 identifies the kinds of tuners of different manufactures, models, or the like to be alternatively used. The system controller 1 is an example of upper control unit and identifying unit in the present invention. The memory 2 is an example of storing unit in the present invention.

The tuner unit 3 is constructed by the tuner 4 and a tuner control module (hereinafter, referred to as "module") 5. The tuner 4 includes a tuner circuit, an analog IF (Intermediate Frequency) detecting circuit, and the like. The tuner circuit includes a local oscillator, a PLL (Phase Lock Loop) circuit, and an AFT (Auto Frequency Tuning) circuit etc. The tuner 4 receives, via an antenna 9, analog and digital television broadcast signals (a television broadcast signal of terrestrial analog broadcasting, and television broadcast signals of terrestrial digital broadcasting, BS digital broadcasting, CS digital broadcasting, digital high-definition broadcasting included in the digital broadcastings, and the like). The tuner 4 converts an RF (Radio Frequency) signal of the terrestrial analog broadcasting input from the antenna 9 to the tuner circuit to an analog IF signal by the local oscillator. In this process, the tuner 4 makes the oscillation frequency of the local oscillator synchronized with the input frequency (the frequency of a selected channel) by the PLL circuit, controls the oscillation frequency by the AFT circuit, and makes the intermediate frequency of the analog IF signal coincide with a reference frequency. The tuner 4 outputs the analog IF signal from the tuner circuit to the analog IF detection circuit (AIF OUT), detects the analog IF signal by the analog IF detection circuit, and outputs an analog video signal and an analog audio signal to a signal processor 6 (analog broadcast V/A OUT).

The tuner 4 converts an RF signal of the terrestrial digital broadcasting or the like input from the antenna 9 to a digital IF signal by the local oscillator in the tuner circuit, and outputs the digital IF signal to the module 5 (DIF OUT). In this process, the tuner 4 makes the oscillation frequency of the local oscillator synchronized with input frequency by the PLL circuit. The module 5 includes a microcomputer, a digital demodulator (VSB/QAM demodulator), a forward error correction (FEC) circuit, an MPEG (Moving Picture Experts Group)-2 transfer interface, and a digital TV backend circuit and the like. The digital demodulator includes an analog-digital converter (ADC). While controlling the tuner 4, the module 5 detects a digital IF signal output from the tuner 4 by the digital demodulator and converts the signal to a digital video signal and a digital audio signal by the analog-digital converter. The module 5 converts the digital video signal and the digital audio signal to an analog video signal and an analog audio signal by the digital TV backend circuit via the forward error correction circuit and the MPEG-2 transfer interface, and outputs the analog video signal and the analog audio signal to the signal processor 6 (digital broadcast V/A OUT). Further, the module 5 performs data communication with the tuner 4 and the system controller 1 via an IIC (Inter Integrated Circuit) bus 8. In a memory in the module 5, parts 12 of control information for controlling a plurality of kinds of tuners 4 alternatively used are stored. In a memory in the tuner 4, parts 11 of control information for controlling the tuner 4 by the module 5 are stored.

The signal processor 6 includes a switch circuit, an MPEG circuit, an analog-digital converter, and the like. The signal processor 6 switches signals to be processed to the analog video signal and the analog audio signal output from the tuner 4 or the module 5 by a switch circuit in accordance with selection of analog broadcasting reception and digital broadcasting reception. The signal processor 6 processes the analog video signal and the analog audio signal output from the tuner 4 or the module 5 and outputs the processed signals to a television (television receiver), a VCR (Video Cassette Recorder), or the like provided externally or integrally with the television receiver 10. The television displays a video image on a display on the basis of the video signal output from the signal processor 6, and outputs sound from a speaker on the basis of the audio signal output from the signal processor 6. The VCR records the video signal and the audio signal output from the signal processor 6 onto a video tape. The signal processor 6 converts the analog video signal and the analog audio signal output from the tuner 4 or the module 5 to a digital video signal and a digital audio signal by the analog-digital converter, compresses the signals in the MPEG format by the MPEG circuit, and outputs the compressed signals to an HDD (Hard Disk Drive), an optical disk drive, or the like provided externally or integrally with the television receiver 10. The HDD records the digital video and audio data output from the signal processor 6 onto a magnetic disk. The optical disk drive records the digital video and audio data output from the signal processor 6 onto an optical disk such as a DVD (Digital Versatile Disk). A power supply unit 7 is connected to an AC receptacle via a power cord or the like and supplies power to the parts of the television receiver 10. In addition, the television receiver 10 has known components such as a not-shown display, an operation unit, a remote controller, and the like.

Figure 2:
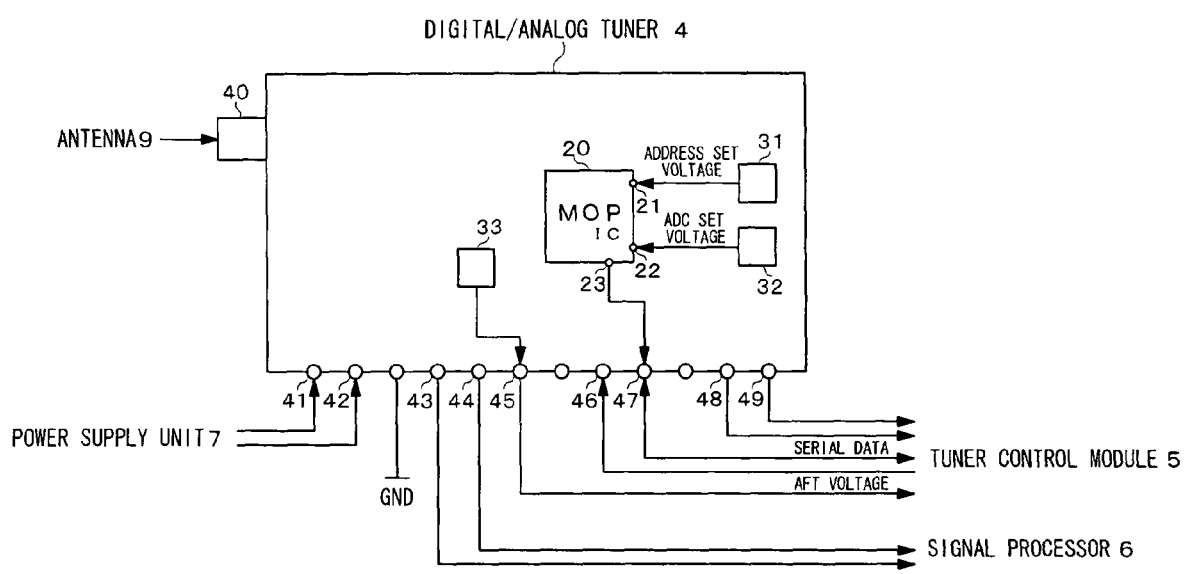
FIG. 2 is a diagram showing the structure of a part of a tuner.

FIG. 2 is a diagram showing the structure of a part of the tuner 4. The tuner 4 has, in addition to the aforementioned tuner circuit and the analog IF detection circuit etc., an MOP 20, voltage variable circuits 31 to 33, and the like. The MOP 20 is a controller IC of the PLL circuit described above and is included in the tuner circuit. In a plurality of tuners 4 of different manufacturers, models, or the like, the same MOP 20 is often used. Address data indicative of the address of the tuner 4, status byte data as information on control of the tuner 4 by the module 5, and the like is transmitted from a port 23 of the MOP 20 to the module 5 via a terminal 47 of the tuner 4. The voltage variable circuit 31 is a circuit for changing the level of address set voltage supplied to a port 21 of the MOP 20 at the time of transmitting the address data in accordance with the kind of the tuner 4. The voltage variable circuit 32 is a circuit for changing the level of ADC (Analog Digital Converter) set voltage supplied to a port 22 of the MOP 20 at the time of transmitting the status byte data in accordance with the kind of the tuner 4. The MOP 20 is provided with a plurality of not-shown ports other than the ports 21 to 23. The voltage variable circuit 33 is a circuit for varying the level of the AFT voltage output from the tuner 4 in accordance with the kind of the tuner 4 at the no-signal time. The AFT voltage is a voltage according to the deviation between the carrier frequency of the analog IF signal and the reference frequency. The no-signal time is defined as a time when the tuner 4 receives no television broadcast signal, that is, when the tuner 4 is not physically connected or not electrically connected due to release of the semiconductor switch or the like and it is before the channel is selected.

An RF signal from the antenna 9 is input from a terminal 40 of the tuner 4. A tuning voltage (VT=+32 V) is applied from the power supply unit 7 to a terminal 41. A power supply voltage (Vcc=+5 V) is applied from the power supply unit 7 to a terminal 42. An analog audio signal and an analog video signal based on analog broadcast generated by the analog IF detection circuit in FIG. 1 are output from terminals 43 and 44, respectively. An AFT voltage of the analog IF is output from a terminal 45. A serial clock signal is input from a terminal 46. A serial data signal is input/output to/from the terminal 47. Digital IF signals generated by the tuner circuit in FIG. 1 are output from terminals 48 and 49. The tuner 4 has a plurality of input/output terminals other than the terminals 40 to 49.

Figure 3:
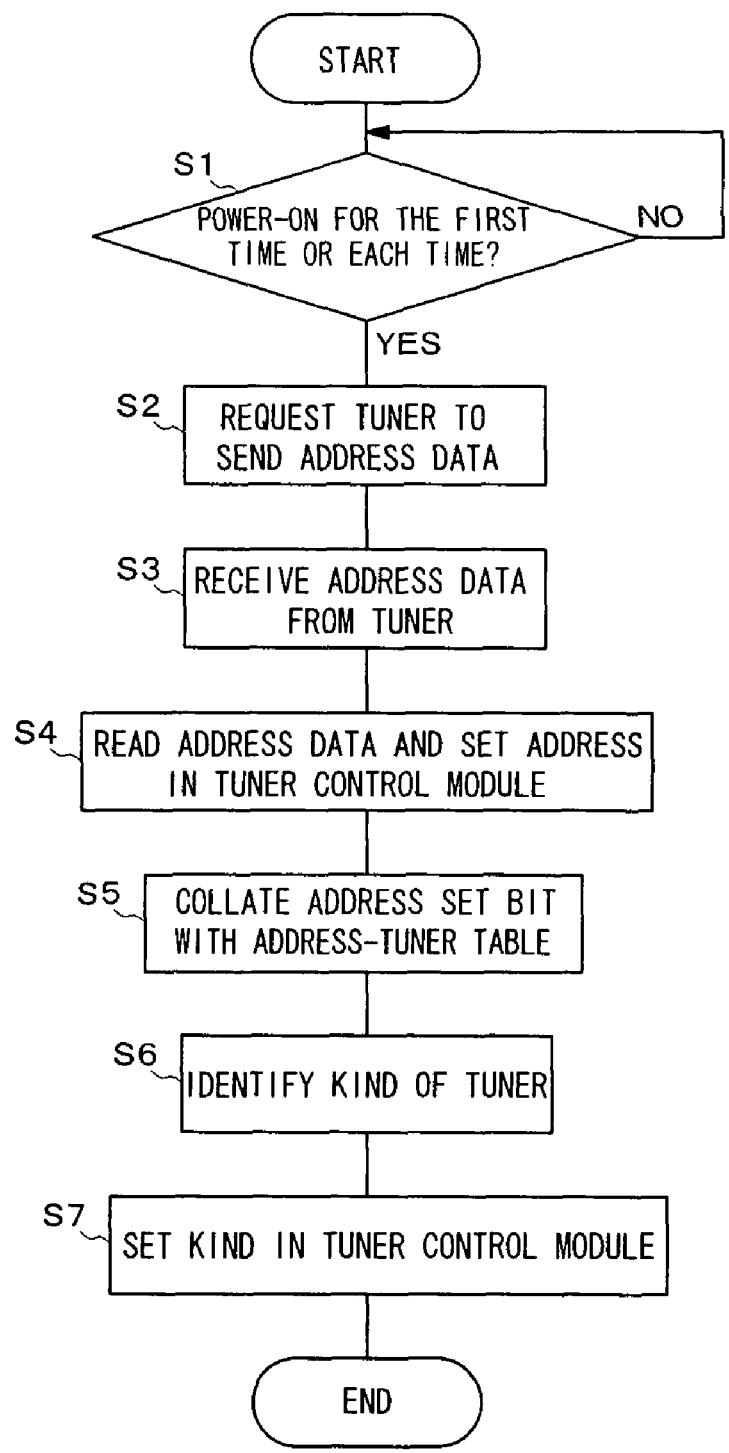
FIG. 3 is a flowchart showing the procedure of a first tuner identifying process.

FIGS. 3 to 5 are diagrams for explaining a first tuner identifying method. FIG. 3 is a flowchart showing the procedure of the first tuner identifying process. When the power of the television receiver 10 is turned on for the first time or each time the power is turned on (YES in step S1), the system controller 1 transmits a command of requesting transmission of address data to the tuner 4 via the module 5 (step S2). The power-on denotes connection of the power cord of the television receiver 10 to an AC receptacle or turn-on of the power supply switch provided for the operation unit of the television receiver 10 or a remote controller. The power is turned on before reception of the television broadcast signal by the tuner 4 starts. When the command is received by the tuner 4, the MOP 20 transmits address data 51 as shown in FIG. 4, and the system controller 1 receives the address data 51 via the module 5 (step S3).

As shown in FIG. 4, the address data 51 is 8-bit serial data. An acknowledge bit A is added to the end of the address data 51. The first five digits of the address data 51 are address bits indicative of the address of the tuner 4. The last digit out of the last three digits of the address data 51 is a read bit R (=1) or write bit W (=0), and the other two digits are address set bits X0 and X1. The MOP 20 sets the address set bits X0 and X1 as "0" or "1" in accordance with the level of the address set voltage input to the port 21 shown in FIG. 2 and transmits the resultant address data 51 from the port 23. By using the characteristic, the level of the address set voltage is varied according to the kind of the tuner 4 by the voltage variable circuit 31.

FIG. 5 is a diagram showing an address-tuner table 61 showing the correspondence relations among the address set bits X0 and X1, the address set voltage, and the kind of the tuner 4. The manufacturer of the television receiver 10 assigns the address set bits X0 and X1 and the address set voltage level differently to each of the kinds (a to d) of the tuner 4 as candidates to be used. The manufacturer of the tuner 4 designs the voltage variable circuit 31 so that the address set voltage of the same level as the assigned address set voltage level can be input to the port 21 of the MOP 20 in accordance with the kind (a to d) of the tuner 4. Consequently, for example, in the case where the kind of the tuner 4 is "a", the address set voltage input to the port 21 of the MOP 20 is "(0 to 0.1)×Vcc", and each of the address set bits X0 and X1 of the address data 51 output from the port 23 of the MOP 20 is "0". The information of the address-tuner table 61 is included in the tuner information 60 in FIG. 1 and stored in the memory 2. The information of the address set voltage level in the address-tuner table 61 may not be included in the tuner information 60 and stored in the memory 2.

When the address data 51 transmitted from the tuner 4 is received, the system controller 1 reads the address data 51 and sets the address of the tuner 4 in the module 5 (records the address in a memory provided in the module 5) (step S4). The system controller 1 collates the address set bits X0 and X1 of the address data 51 with the address-tuner table 61 stored in the memory 2 (step S5) and identifies the kind of the tuner 4 (step S6). The system controller 1 then sets the identified kind of the tuner 4 in the module 5 (step S7) so that the module 5 can control the tuner 4 in accordance with the kind.

Figure 6:
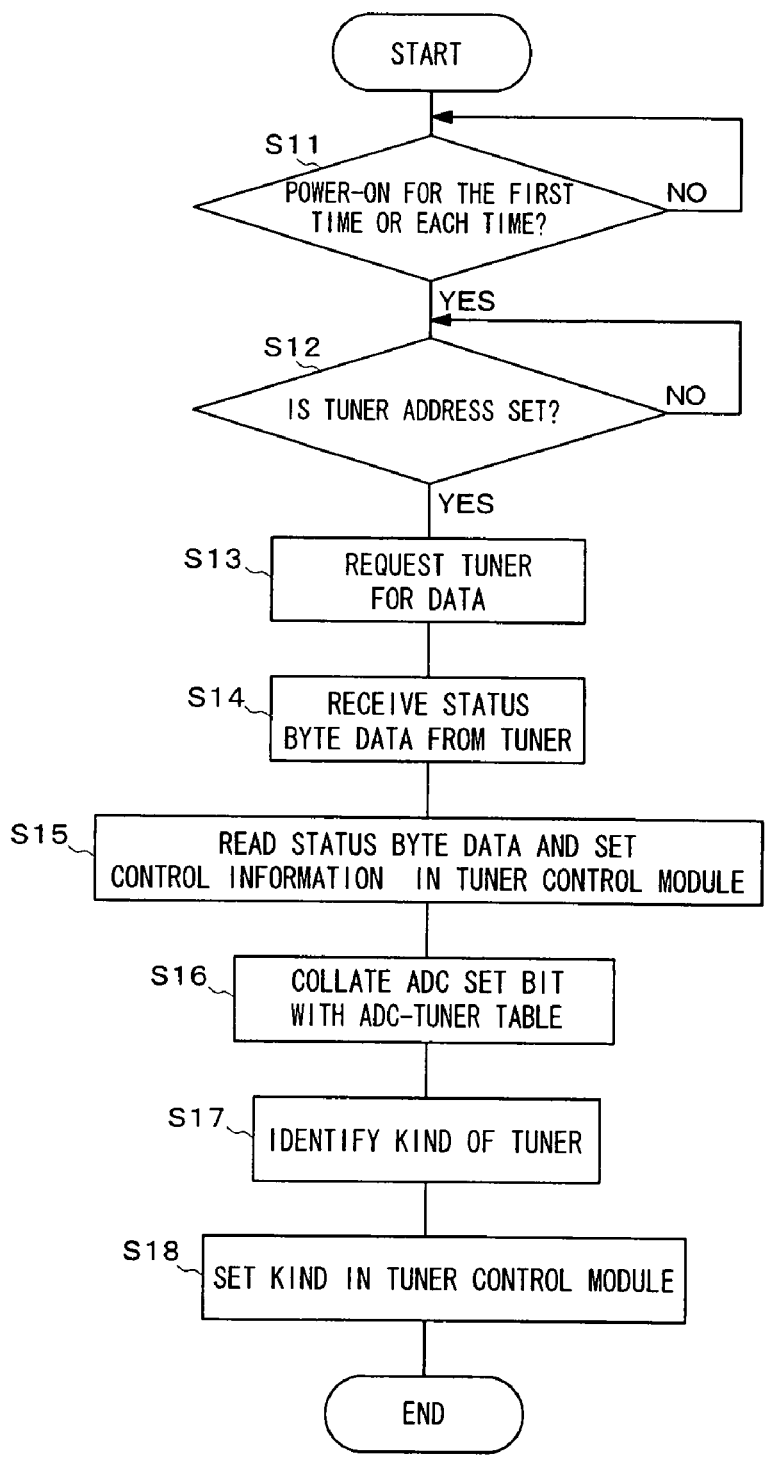
FIG. 6 is a flowchart showing the procedure of a second tuner identifying process.

FIGS. 6 to 8 are diagrams for explaining a second tuner identifying method. FIG. 6 is a flowchart showing the procedure of the second tuner identifying process. When the power of the television receiver 10 is turned on for the first time or each time the power is turned on (YES in step S11), the system controller 1 sets the address of the tuner 4 on the basis of the address data received from the tuner 4 via the module 5 (YES in step S12) and then transmits a command requesting transmission of data to the tuner 4 via the module 5 (step S13). When the command is received in the tuner 4, the MOP 20 transmits status byte data 52 as shown in FIG. 7, and the system controller 1 receives the status byte data 52 via the module 5 (step S14).

As shown in FIG. 7, the status byte data 52 is 8-bit serial data. An acknowledge bit A is added to the end of the status byte data 52. The first digit out of the first five digits of the status byte data 52 is a power ON reset indicator bit POR, the second digit is a phase lock flag bit FL, and the other three digits are fixed bits indicative of "1". The last three digits of the status byte data 52 are ADC (Analog Digital Converter) set bits Y0, Y1, and Y2. When the digital IF signal supplied from the tuner 4 to the module 5 is detected by a digital demodulator of the module 5 and converted to a digital signal by an analog-digital converter, the ADC set bits Y0, Y1, and Y2 indicate the optimum level of the voltage supplied to the analog-digital converter. The optimum level varies according to the kind of the tuner 4. The MOP 20 sets the ADC set bits Y0, Y1, and Y2 as "0" or "1" in accordance with the level of the ADC set voltage input to the port 22 shown in FIG. 2 and transmits the resultant status byte data 52 from the port 23. By using the characteristic, the level of the ADC set voltage is varied according to the optimum level of the input voltage to the analog-digital converter, that is, according to the kind of the tuner 4 by the voltage variable circuit 32.

FIG. 8 is a diagram showing an ADC-tuner table 62 showing the correspondence relations among the ADC set bits Y0, Y1, and Y2, the ADC set voltage, and the kind of the tuner 4. The manufacturer of the television receiver 10 assigns the ADC set bits Y0, Y1, and Y2 differently in accordance with each of the kinds (a to d) of the tuner 4 and every optimum level of an input voltage to the analog-digital converter when using the tuner 4, with reference to the specifications and the like of the tuner 4 as a candidate to be used. Although only four kinds "a" to "d" of the tuners 4 as candidates to be used are shown in FIG. 8, five or more kinds of tuners 4 may be candidates to be used and the ADC set bits Y0, Y1, or Y2 may be assigned differently to each of the tuners 4. The manufacturer of the tuner 4 designs the voltage variable circuit 32 so that the ADC set voltage of the same level as the optimum level of the input voltage to the analog-digital converter can be input to the port 22 of the MOP 20 in accordance with the kind (a to d) of the tuner 4. Consequently, for example, in the case where the kind of the tuner 4 is "a" and the optimum level of the input voltage to the analog-digital converter when using the tuner 4 is "(0 to 0.15)×Vcc", the ADC set voltage input to the port 22 of the MOP 20 also becomes "(0 to 0.15)×Vcc", and each of the ADC set bits Y0, Y1, and Y2 of the status byte data 52 output from the port 23 of the MOP 20 is "0". The information of the ADC-tuner table 62 is included in the tuner information 60 in FIG. 1 and stored in the memory 2. The information of the ADC set voltage level in the ADC-tuner table 62 may not be included in the tuner information 60 and stored in the memory 2.

When the status byte data 52 transmitted from the tuner 4 is received, the system controller 1 reads the status byte data 52 and sets control information (information of the power ON reset indicator bit POR and the phase lock flag bit FL) included in the data 52 into the module 5 (step S15). The system controller 1 collates the ADC set bits Y0, Y1, and Y2 of the status byte data 52 with the ADC-tuner table 62 stored in the memory 2 (step S16) and identifies the kind of the tuner 4 (step S17). The system controller 1 then sets the identified kind of the tuner 4 in the module 5 (step S18) so that the module 5 can control the tuner 4 in accordance with the kind.

Figures 9, 10:
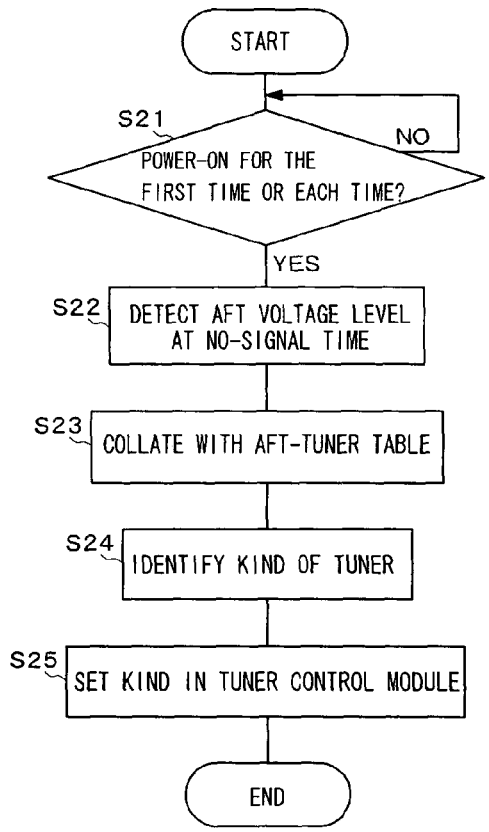
FIG. 9 is a flowchart showing the procedure of a third tuner identifying process.
FIG. 10 is a diagram showing an AFT-tuner table.

FIGS. 9 and 10 are diagrams for explaining a third tuner identifying method. FIG. 9 is a flowchart showing the procedure of a third tuner identifying process. When the power of the television receiver 10 is turned on for the first time or each time the power is turned on (YES in step S21), the system controller 1 detects the level of an AFT voltage output from the tuner 4 at the time of no-signal via the module 5 (step S22). The level of the AFT voltage at the no-signal time is changed by the voltage variable circuit 33 shown in FIG. 2 in accordance with the kind of the tuner 4.

FIG. 10 is a diagram showing an AFT-tuner table 63 showing the correspondence relations between the AFT voltage at the no-signal time and the kind of the tuner 4. The manufacturer of the television receiver 10 assigns the AFT voltage level at the no-signal time differently in accordance with each of the kinds (a to d) of the tuner 4 as a candidate to be used. The manufacturer of the tuner 4 designs the voltage variable circuit 33 so that the AFT voltage of the same level as the assigned AFT voltage level at the no-signal time can be output from the terminal 45 of the tuner 4 at the no-signal time. Consequently, for example, in the case where the kind of the tuner 4 is "a", the AFT voltage output from the terminal 45 of the tuner 4 at the no-signal time becomes "(0 to 0.1)×Vcc". The information of the AFT-tuner table 63 is included in the tuner information 60 in FIG. 1 and stored in the memory 2.

When the AFT voltage level at the no-signal time is detected, the system controller 1 collates the AFT voltage level with the AFT-tuner table 63 stored in the memory 2 (step S23) and identifies the kind of the tuner 4 (step S24). The system controller 1 then sets the identified kind of the tuner 4 in the module 5 (step S25) so that the module 5 can control the tuner 4 in accordance with the kind.

After completion of execution of at least one of the first to third tuner identifying processes, the system controller 1 makes the module 5 control the tuner 4 in accordance with the kind of the tuner 4. Specifically, the module 5 performs data communication with the tuner 4 to transmit/receive the control information 12 and 11, controls the tuner 4 in accordance with the kind of the tuner 4, receives a television broadcast signal of the frequency of a selected channel, processes the reception signal, and outputs a video signal and an audio signal. When all of the first to third tuner identifying processes are not executed, installation of the voltage variable circuits 31 to 33 in the tuner 4 and storage of the information of the tuner tables 61 to 63 into the memory 2 for the identifying processes not executed may be omitted.

According to the above-described configuration, even when the electronic parts such as the MOP 20 used in the tuners 4 of different manufacturers, different models etc. are the same, by executing at least one of the first to third tuner identifying processes, the kind of the tuner 4 is identified automatically and reliably, and the tuner 4 can be controlled in accordance with its kind by the module 5. As a result, even when any of the plurality of kinds of tuners 4 is used alternatively, a television broadcast signal can be always received with high precision and a video signal and an audio signal can be output.

Since the voltage variable circuits 31 to 33 for varying the address data, status byte data, or the AFT voltage at the no-signal time output from the tuner 4 are provided for the tuner 4, it is unnecessary to replace the module 5 or change the circuit or the like of the module 5. Thus, the module 5 can be commonly used, so that the cost can be reduced.

The information for identifying the kind of the tuner 4 is included in the address data or the status byte. Consequently, without performing data communication with the tuner 4 only for identifying the kind of the tuner 4, the kind of the tuner 4 can be identified, thereby the process load on the system controller 1 and the module 5 on the data communication can be reduced.

Since the level of the AFT voltage at the no-signal time is changed according to the kind of the tuner 4, without performing data communication with the tuner 4, the kind of the tuner 4 can be identified more reliably by the second tuner identifying process, and the tuner 4 can be controlled according to the kind by the module 5.

Once a control not adapted to the kind of the tuner 4 is performed by the module 5, there is a case that the tuner 4 does not accept the control of the module 5 after that. But in the above embodiment, when the power is turned on for the first time or each time the power is turned on, i.e. before start of control of the tuner 4 by the module 5, execution of at least one of the first to third tuner identifying processes is started. Thus, the kind of the tuner 4 is identified more reliably and the tuner 4 can be controlled by the module 5 in accordance with the kind.

By executing at least one of the first to third tuner identifying processes only at the first power-on to identify the kind of the tuner 4, the process loads on the system controller 1, the module 5, and the tuner 4 at the subsequent power-on times can be lessened.

By executing at least one of the first to third tuner identifying process each time power is turned on to identify the kind of the tuner, even when the tuner 4 is replaced for a failure or the like, the tuner 4 can be reliably controlled in accordance with the kind by the module 5. Hence, a television broadcast signal can be received with high precision, and a video signal and an audio signal can be output.

Further, by executing any combination of the first to third tuner identifying processes, even when identification of the kind of the tuner 4 fails by one of the tuner identifying processes, the kind of the tuner 4 can be identified by another tuner identifying process. Hence, the identification of the kind of the tuner 4 and the control according to the kind of the tuner 4 by the module 5 can be executed reliably and accurately.

The present invention can employ various modes other than the foregoing embodiments. For instance, in the foregoing embodiment, the present invention is applied to the television receiver 10 in which the digital-analog tuner 4 is mounted, while the present invention can be also applied to a television receiver in which, for example, an analog tuner or digital tuner is mounted. Moreover, the present invention can be applied to a television receiver such as a TV set, a VCR, a DVD recorder, a Blu-ray Disc® recorder, an HDD recorder, and a composite device obtained by integrating at least two of the devices, a simple receiver having no function of recording/reproducing a video image and sound, and the like.

What is claimed is:

1. A television receiver having a tuner for receiving a digital television broadcast signal, and a module for controlling the tuner and outputting a digital video signal and a digital audio signal,
    wherein the tuner is provided with at least one of a first circuit for changing level of an input voltage to a first port of an IC provided for the tuner in accordance with the kind of the tuner and a second circuit for changing level of an input voltage to a second port of the IC in accordance with the kind of the tuner, and a third circuit for changing level of an AFT (Auto Frequency Tuning) voltage which is output at the no-signal time from the tuner in accordance with the kind of the tuner,
    the IC changes a bit of a predetermined digit in address data indicative of address of the tuner or status byte data indicative of information on control of the tuner by the module in accordance with the level of the input voltage to the first port or the second port, and transmits the resultant data, and
    the television receiver comprises:
        a storing unit that stores at least one of first information indicative of the correspondence relation between the bit in the address data and the kind of the tuner and second information indicative of the correspondence relation between the bit in the status byte data and the kind of the tuner, and third information indicative of the correspondence relation between the AFT voltage level at the no-signal time and the kind of the tuner;
        an identifying unit that identifies the kind of the tuner by performing at least one of collation of the bit in the address data received from the tuner with the first information and collation of the bit in the status byte data received from the tuner with the second information,
    wherein the module controls the tuner in accordance with the kind of the tuner identified by the identifying unit.

2. The television receiver according to claim 1, wherein when a power supply is turned on for the first time or each time the power supply is turned on, the identifying unit performs at least one of the collations and identifies the kind of the tuner.

* * * * *